(12) United States Patent
Maffre et al.

(10) Patent No.: US 11,572,189 B2
(45) Date of Patent: Feb. 7, 2023

(54) ACOUSTIC ABSORPTION STRUCTURE COMPRISING A LIQUID DRAINAGE SYSTEM AND PROPULSIVE ASSEMBLY COMPRISING SUCH AN ACOUSTIC ABSORPTION STRUCTURE

(71) Applicant: Airbus Operations SAS, Toulouse (FR)

(72) Inventors: Claire Maffre, Lias (FR); Jérôme Gaillardo, Cugnaux (FR); Lionel Czapla, Cornebarrieu (FR); Florian Ravise, Saint-Herblain (FR); Laurent Caliman, Toulouse (FR); Laurent Cazeaux, Tournefeuille (FR); Antoine Cousin, L'Union (FR); Denis Brossard, Saint Aignan de Grand Lieu (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 603 days.

(21) Appl. No.: 16/695,375

(22) Filed: Nov. 26, 2019

(65) Prior Publication Data

US 2020/0164998 A1 May 28, 2020

(30) Foreign Application Priority Data

Nov. 28, 2018 (FR) ...................................... 1871982

(51) Int. Cl.
*F02K 1/34* (2006.01)
*F02C 7/24* (2006.01)
(Continued)

(52) U.S. Cl.
CPC ................ *B64D 33/06* (2013.01); *F02C 7/24* (2013.01); *G10K 11/162* (2013.01); *G10K 11/172* (2013.01); *F05D 2220/323* (2013.01)

(58) Field of Classification Search
CPC ......... B64D 33/06; F02C 7/24; G10K 11/162; G10K 11/172; F05D 2220/323
See application file for complete search history.

(56) References Cited

U.S. PATENT DOCUMENTS

| 5,315,820 A | 5/1994 | Arnold |
| 5,462,331 A | 10/1995 | Stief et al. |

(Continued)

FOREIGN PATENT DOCUMENTS

| EP | 3618057 A1 * | 3/2020 | ............. B64D 33/06 |
| FR | 3055662 A1 | 3/2018 | |
| GB | 2247712 A * | 3/1992 | ............. B29C 70/08 |

OTHER PUBLICATIONS

French Search Report; priority document.
(Continued)

*Primary Examiner* — Forrest M Phillips
(74) *Attorney, Agent, or Firm* — Greer, Burns & Crain, Ltd.

(57) ABSTRACT

An acoustic absorption structure comprising a plurality of resonators. Each resonator comprises a first chamber which has a first mouthpiece delimited by an edge pressed against an inner surface of a porous zone of a skin so that the first chamber and the skin delimit a first cavity, a second chamber, in which is positioned the first chamber, which delimits, with the first chamber, a second cavity, at least one acoustic orifice passing through the first chamber, at least one drainage orifice passing through the first chamber and at least one drainage hole passing the second chamber, each drainage orifice and each drainage hole being configured to limit an accumulation of fluid in the resonator. Also, an aircraft propulsive assembly or an aircraft comprising the acoustic absorption structure are provided.

13 Claims, 16 Drawing Sheets

(51) Int. Cl.
    *G10K 11/162*     (2006.01)
    *G10K 11/172*     (2006.01)

(56) References Cited

U.S. PATENT DOCUMENTS

| | | | | |
|---|---|---|---|---|
| 5,543,198 | A * | 8/1996 | Wilson | B32B 7/12 |
| | | | | 428/116 |
| 6,371,242 | B1 * | 4/2002 | Wilson | B32B 7/12 |
| | | | | 428/116 |
| 11,339,720 | B2 * | 5/2022 | Van Ness | F04D 29/665 |
| 2008/0308345 | A1 * | 12/2008 | Borchers | F02C 7/24 |
| | | | | 181/222 |
| 2013/0186707 | A1 * | 7/2013 | Richter | F02K 1/827 |
| | | | | 181/292 |
| 2019/0161157 | A1 * | 5/2019 | Ravise | G10K 11/172 |
| 2020/0049074 | A1 * | 2/2020 | Geertsema | B29D 99/0089 |
| 2020/0049076 | A1 * | 2/2020 | Balike | F04D 29/668 |
| 2020/0072161 | A1 | 3/2020 | Bouchet et al. | |
| 2020/0143786 | A1 * | 5/2020 | Ravise | B64C 1/40 |
| 2020/0165975 | A1 * | 5/2020 | Brochard | F02K 1/827 |
| 2020/0202830 | A1 * | 6/2020 | Brossard | B32B 3/12 |
| 2020/0265821 | A1 * | 8/2020 | Riccobene | F02K 1/827 |
| 2020/0342843 | A1 * | 10/2020 | Brossard | B32B 38/1808 |
| 2021/0049993 | A1 * | 2/2021 | Cazeaux | B64D 33/00 |
| 2021/0146861 | A1 * | 5/2021 | Fukumoto | G10K 11/168 |

OTHER PUBLICATIONS

Daniel Redmann et al., "Aero-acoustic liner applications of the broadband special acoustic absorber concept," Berlin Germany, May 27, 2013.

* cited by examiner

ACOUSTIC ABSORPTION STRUCTURE COMPRISING A LIQUID DRAINAGE SYSTEM AND PROPULSIVE ASSEMBLY COMPRISING SUCH AN ACOUSTIC ABSORPTION STRUCTURE

CROSS-REFERENCES TO RELATED APPLICATIONS

This application claims the benefit of the French patent application No. 1871982 filed on Nov. 28, 2018, the entire disclosures of which are incorporated herein by way of reference.

FIELD OF THE INVENTION

The present application relates to an acoustic absorption structure comprising a liquid drainage system and a propulsive assembly comprising such an acoustic absorption structure.

BACKGROUND OF THE INVENTION

According to an embodiment of the prior art, a propulsive assembly comprises a nacelle and a turbofan engine, positioned inside the nacelle and having, at the rear, a primary ejection duct through which the waste gases from the combustion are evacuated. This primary ejection duct comprises, at its skin, an acoustic absorption structure for attenuating the noise over several frequency bands, such as, for example, the noises associated with the combustion (300-1000 Hz) and the noises associated with the operation of the turbine (higher than or equal to 4000 Hz).

Such an acoustic absorption structure is described in the document "Aero-acoustic liner applications of the broadband special acoustic absorber concept," American Institute of Aeronautics and Astronautics, AIAA 2013-2176, 19th AIAA/CEAS Aeroacoustics Conference May 27-29, 2013, Berlin, Germany. It comprises a plurality of capsules closed by the skin of the primary ejection duct so as to each delimit a cavity in which is positioned a truncated hollow cone, at a distance from the capsule, which has a base emerging at the skin of the primary ejection duct. Each cone comprises at least one orifice, making it possible to connect the interior of the cone with the space between the cone and the capsule, positioned and dimensioned according to the acoustic characteristics sought. In addition, the skin of the primary ejection duct is porous in line with each cone.

An acoustic absorption formed thus, based on the same principle as a Helmholtz resonator and a quarter-wave resonator, makes it possible to effectively attenuate the low-frequency sounds emitted by the turbine engine.

Since the skin of the primary ejection duct is porous in line with the cones and since the latter are perforated, water or any other liquid can accumulate and stagnate, in operation, inside each cone and in the space delimited by each cone and its capsule. This accumulation of water or of liquid affects the efficiency of the acoustic absorption structure. Furthermore, in case of freezing, the water transformed into ice can damage the acoustic absorption structure.

The present invention aims to remedy all or part of the drawbacks of the prior art.

SUMMARY OF THE INVENTION

To this end, a subject of the invention is an acoustic absorption structure comprising a plurality of resonators, positioned against an inner surface of a skin, each comprising:

- a first chamber which has a first mouthpiece delimited by an edge pressed against the inner surface of the skin so that the first chamber and the skin delimit a first cavity,
- a second chamber in which is positioned the first chamber, at least partially spaced apart from the first chamber, which delimits, with the first chamber, a second cavity,
- at least one acoustic orifice passing through the first chamber to connect the first and second cavities,
- a porous zone, forming a part of the skin, making it possible, in operation, to connect a medium in which sound waves are propagated with the first cavity.

According to the invention, the first chamber comprises at least one drainage orifice passing through the first chamber and the second chamber comprises at least one drainage hole passing through the second chamber, each drainage orifice and each drainage hole being configured to limit an accumulation of fluid in the resonator.

This solution makes it possible to greatly reduce the volume of fluids likely to stagnate in the resonator, limiting the risks of damaging the resonator and of affecting its efficiency in terms of acoustic treatment.

According to another feature, the first chamber comprises a first lateral wall which has a first edge forming the first mouthpiece and each drainage orifice is positioned on the first lateral wall, close to the first edge of the first lateral wall.

According to a first embodiment, the first chamber comprises a single drainage orifice and the resonator is oriented so that the drainage orifice is situated close to or at a lowest point of the first lateral wall.

According to a second embodiment, the first chamber comprises multiple drainage orifices distributed over all the periphery of the first lateral wall.

According to one configuration, the first chamber comprises a number of drainage orifices lying between 4 and 12 and/or each drainage orifice has a diameter lying between 0.8 and 2 mm.

According to another feature, the second chamber comprises a second lateral wall, delimited by a first edge oriented towards the skin and a second edge, and a second bottom wall positioned at the level of the second edge of the second lateral wall, each drainage hole being positioned on the second bottom wall, close to the second lateral wall.

According to the first embodiment, the second chamber comprises a single drainage hole and the resonator is oriented so that the drainage hole is situated close to or at a lowest point of the second bottom wall.

According to the second embodiment, the second chamber comprises multiple drainage holes distributed over all the periphery of the second bottom wall.

According to one configuration, the second chamber comprises a number of drainage holes lying between 4 and 12 and/or each drainage hole has a diameter lying between 0.8 and 2 mm.

According to another feature, the first and second chambers having a same axis of revolution (Ax), each drainage orifice is secant with a longitudinal plane containing the axis of revolution (Ax) that is also secant with a drainage hole.

Another subject of the invention is an aircraft propulsive assembly or an aircraft comprising an acoustic absorption structure according to one of the preceding features.

BRIEF DESCRIPTION OF THE DRAWINGS

Other features and advantages will emerge from the following description of the invention, the description being given purely by way of example in light of the attached drawings in which:

FIG. 6 is a perspective view of a first chamber of the resonator visible in

FIG. 5,

FIG. 11 is a perspective view of a first chamber of the resonator visible in

FIG. 10,

DETAILED DESCRIPTION OF THE PREFERRED EMBODIMENTS

Figure 1:
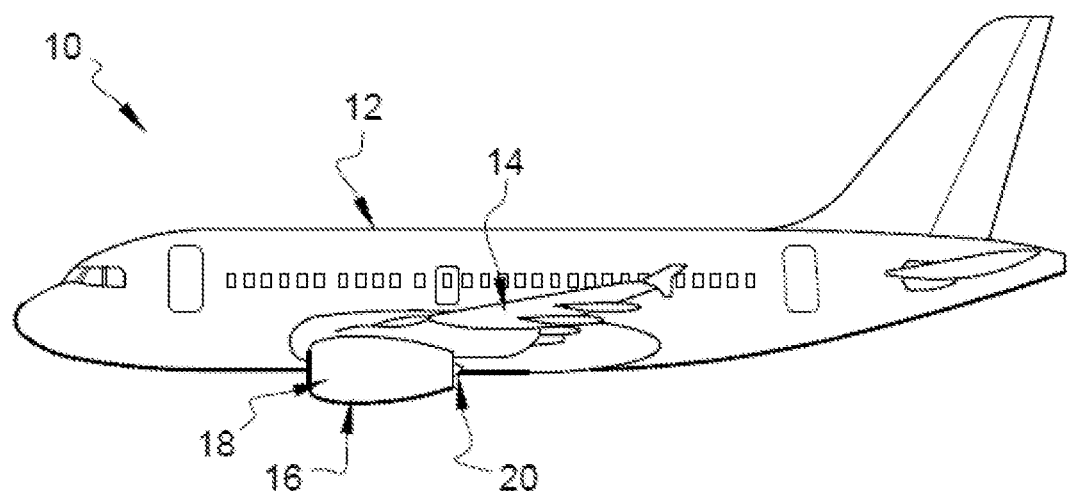
FIG. 1 is a lateral view of an aircraft.
Figure 2:
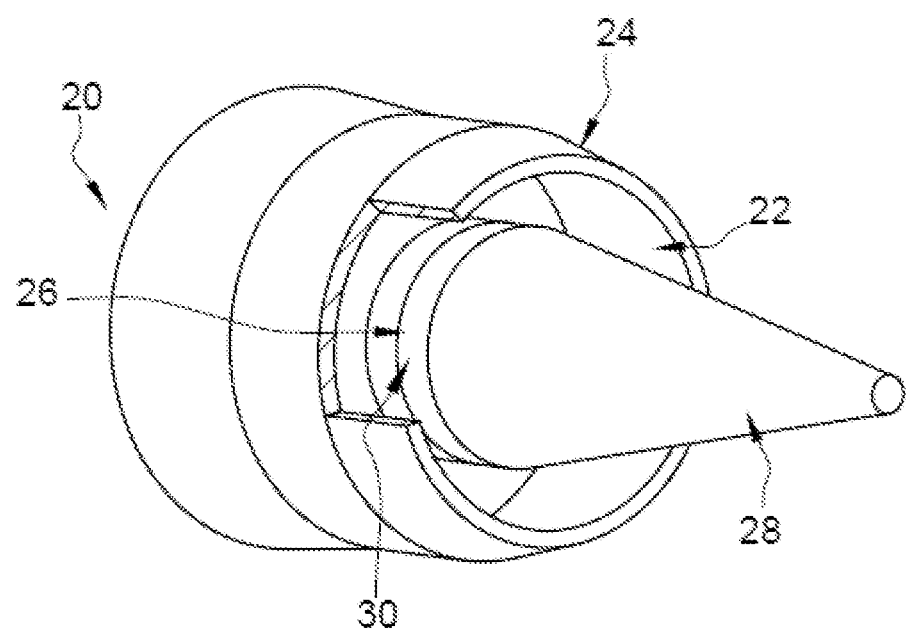
FIG. 2 is a perspective view of a primary ejection duct comprising an acoustic absorption structure which illustrates an application of the invention.

In FIG. 1, an aircraft 10 is represented which has a fuselage 12, two wings 14, disposed on either side of the fuselage 12, and propulsive assemblies 16 fixed under the wings 14. Each propulsive assembly 16 comprises a nacelle 18 and turbine engine 20 positioned inside the nacelle 18.

According to one embodiment, the turbine engine 20 comprises, at the rear, a primary ejection duct 22, through which gases burned in the turbine engine 20 escape, which is delimited on the outside by a primary nozzle 24 and on the inside by an inner structure 26 extended by a nozzle cone 28.

According to one configuration, the inner structure 26 comprises an acoustic absorption structure 30, positioned against a skin 32, which delimits the primary ejection duct 22 and which has an outer surface SE, in contact with the waste gases, and an inner surface SI, opposite the outer surface SE.

Although described as applied to a primary ejection duct 22, the invention is not limited to that application. Thus, the acoustic absorption structure 30 can be positioned on any skin 32 which has an outer surface SE in contact with a medium in which sound waves are propagated and an inner surface SI opposite the surface SE.

The acoustic absorption structure 30 comprises, in addition to the skin 32, a plurality of resonators 34 positioned against the inner surface SI of the skin 32. According to one configuration, the resonators 34 can be positioned in at least one cellular structure, of honeycomb type for example, pressed against the inner surface SI. Each resonator 34 comprises:
- a first chamber 36, also called a cone, which has a first mouthpiece 38 delimited by an edge pressed against the inner surface SI of the skin 32 so that the first chamber 36 and the skin 32 delimit a first cavity 40,
- a second chamber 44, also called a capsule, in which is positioned the first chamber 36, at least partially spaced apart from the first chamber 36, which has a second mouthpiece 46 delimited by an edge pressed against the first chamber 36 (or possibly the inner surface SI of the skin 32) so that the second chamber 44 and the first chamber 36 (and possibly the skin 32) delimit a second cavity 48,
- at least one acoustic orifice 50 passing through the first chamber 36 to connect the first and second cavities 40, 48,
- a porous zone 42, forming a part of the skin 32, making it possible to connect the medium in which the sound waves are propagated with the first cavity 40.

Figure 3:
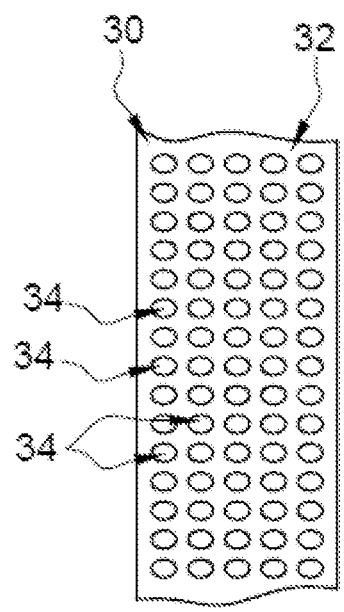
FIG. 3 is a plan view, from the interior of the primary ejection duct, of a part of the skin of the duct visible in FIG. 2.
Figure 4:
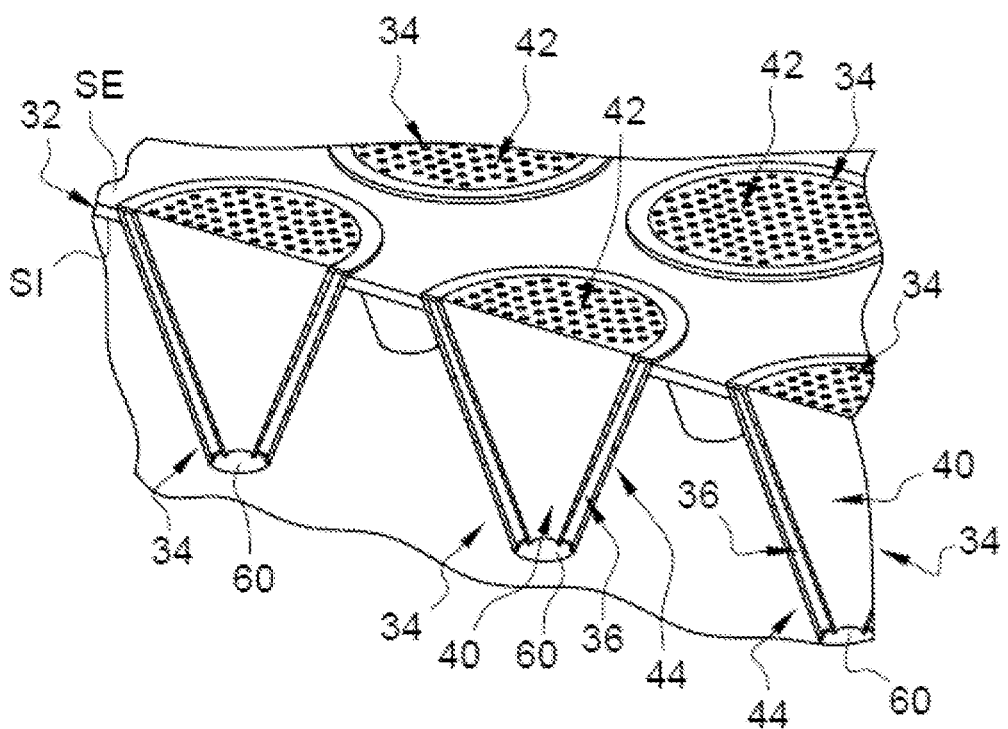
FIG. 4 is a perspective cross section of a part of a primary ejection duct equipped with an acoustic absorption structure which illustrates an embodiment of the invention.
Figure 5:
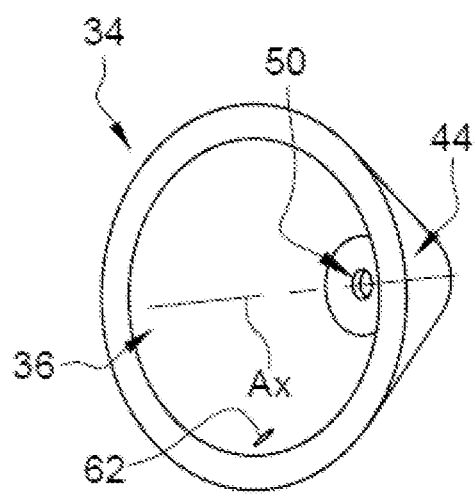
FIG. 5 is a perspective view of a resonator of an acoustic absorption structure (without the skin) which illustrates a first embodiment of the invention.
Figure 6:
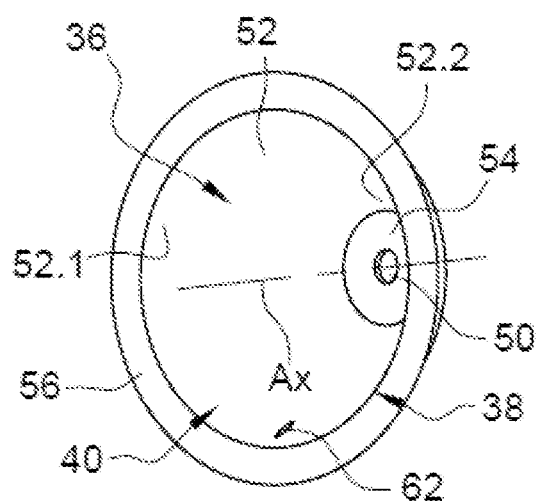
Figure 7:
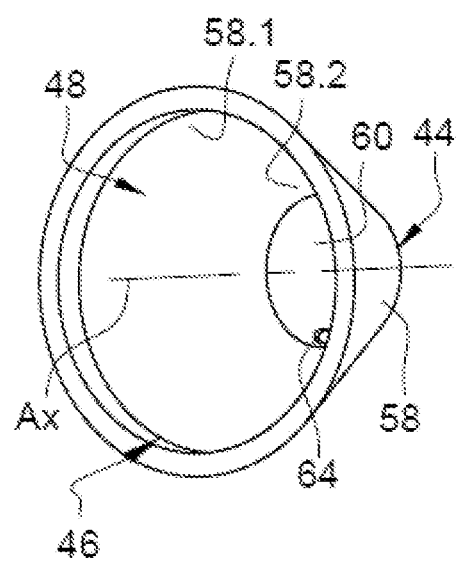
FIG. 7 is a perspective view of a second chamber of the resonator visible in FIG. 5.

According to an arrangement visible in FIG. 3, the resonators 34 are arranged in multiple rows and multiple columns.

According to one embodiment, the first and second mouthpieces 38, 46 each have a section in the form of a disc and the porous zone 42 has a section approximately identical to that of the first mouthpiece 38.

Each first chamber 36 is tapered and comprises:
- a tapered first lateral wall 52, delimited by a first edge 52.1, forming the first mouthpiece 38 and oriented towards the skin 32, and by a second edge 52.2 opposite and approximately parallel to the first edge 52.1,
- a flat first bottom wall 54, approximately parallel to the skin 32, positioned at the level of the second edge 52.2 of the first lateral wall 52, and
- a flange 56, positioned at the level of the first edge 52.1 of the first lateral wall 52, outside the first lateral wall 52 and pressed against the inner surface SI of the skin 32.

Each second chamber 44 is tapered and comprises:
- a tapered second lateral wall 58, delimited by a first edge 58.1, forming the second mouthpiece 46, oriented towards the skin 32 and pressed against the flange 56 of the first chamber 36, and by a second edge 58.2 opposite and approximately parallel to the first edge 58.1,
- a flat second bottom wall 60, approximately parallel to the skin 32, positioned at the level of the second edge 58.2 of the second lateral wall 58.

According to one configuration, the first chamber 36 is approximately centered in the second chamber 44 and the first and second bottom walls 54, 60 are spaced apart. The acoustic orifice 50 is positioned at the level of the first bottom wall 54 of the first chamber 36. It is configured according to at least one acoustic characteristic sought.

Obviously, the invention is not limited to this arrangement for the resonators 34 and/or to these geometries and configurations for the first and second chambers 36, 44.

According to a feature of the invention, the first chamber 36 comprises at least one drainage orifice 62, passing through the first chamber 36 to connect the first cavity 40 and the second cavity 48, and the second chamber 44 comprises at least one drainage hole 64 passing through the second chamber 44 to connect the second cavity 48 and the outside of the resonator 34. Each drainage orifice 62 and each drainage hole 64 are configured to limit the accumulation of fluid and of any solid particles in the resonator 34. The at least one drainage orifice 62 is different than the at least one acoustic orifice 50 in order to always leave a free passage of air through the acoustic orifice 50 to enable operation of the acoustic resonator 34. Since the volume of fluids likely to stagnate in the resonator 34 is very small, the presence of the drainage orifice 62 does not disturb the efficiency of the resonator 34 in terms of the acoustic treatment and does not risk damaging the resonator 34.

According to a first embodiment visible in FIGS. 5 to 9, the first chamber 36 comprises a single drainage orifice 62, positioned according to the orientation of the resonator 34 so as to limit the accumulation of liquid in the first cavity 40. In addition, the second chamber 44 comprises a single drainage hole 64, positioned according to the orientation of the resonator 34 so as to limit the accumulation of liquid in the second cavity 48.

According to one configuration, the single drainage orifice 62 is positioned on the first lateral wall 52, close to the first edge 52.1 of the first lateral wall 52. The single drainage hole 64 is positioned on the second bottom wall 60, close to the second edge 58.2 of the second lateral wall 58. Since the first and second chambers 36, 44 are tapered, coaxial and have a same axis of revolution Ax, the drainage orifice 62 and the drainage hole 64 are secant with a same longitudinal plane containing the axis of revolution Ax.

Figure 8:
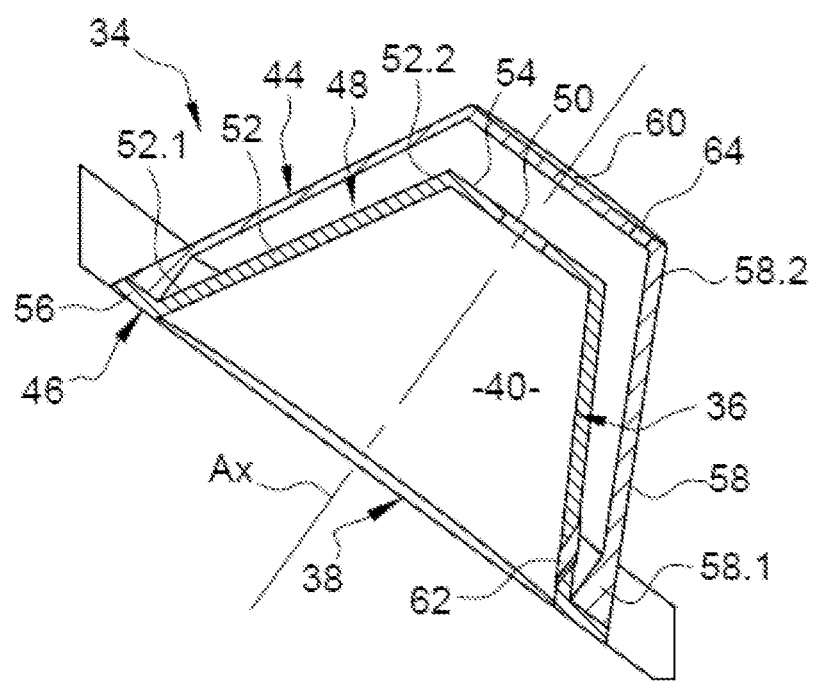
FIG. 8 is a cross section of the resonator, visible in FIG. 5, positioned in the upper part of a duct which illustrates the first embodiment.
Figure 9:
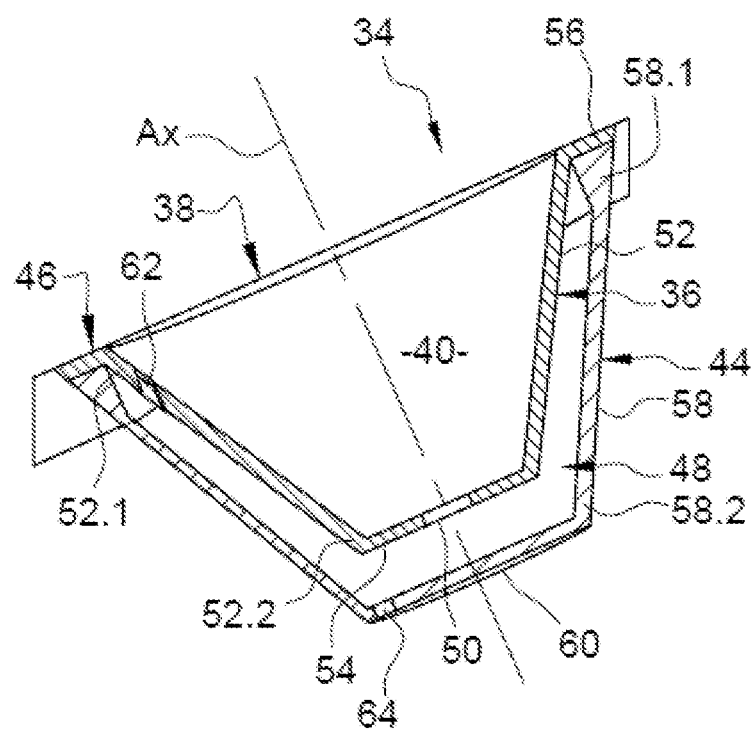
FIG. 9 is a cross section of the resonator, visible in FIG. 5, positioned in the lower part of a duct which illustrates the first embodiment.
Figure 10:
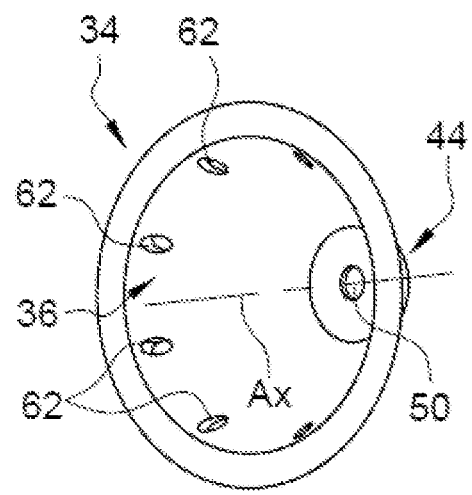
FIG. 10 is a perspective view of a resonator of an acoustic absorption structure (without the skin) which illustrates a second embodiment of the invention.
Figure 11:
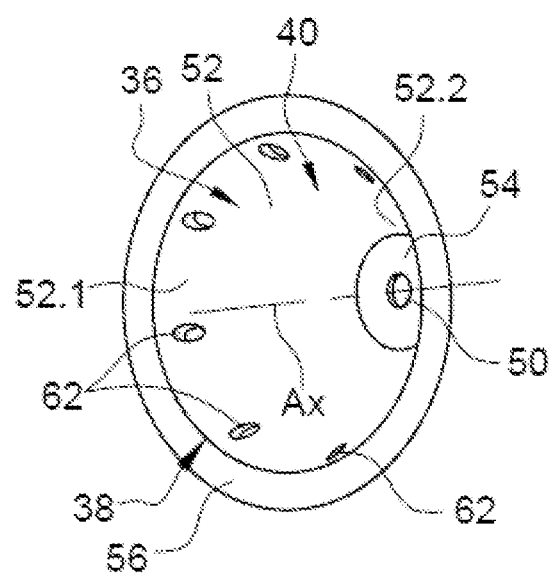
Figure 12:
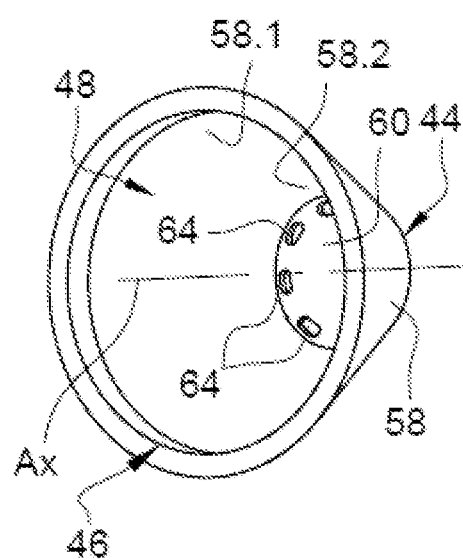
FIG. 12 is a perspective view of a second chamber of the resonator visible in FIG. 10.

According to this first embodiment, each resonator 34 must be correctly positioned according to the positions of the drainage orifice 62 and of the drainage hole 64, as illustrated in FIGS. 8 and 9.

According to a first orientation visible in FIG. 8, when the resonator 34 comprises first and second mouthpieces 38, 46 positioned at a lower altitude than those of the first and second bottom walls 54, 60, the fluids flow via the drainage orifice 62 then via the porous zone 42 of the skin 32. According to this first orientation, the resonator 34 is oriented so that the drainage orifice 62 is situated close to or at a lowest point of the first lateral wall 52.

According to a second orientation visible in FIG. 9, when the resonator 34 comprises first and second mouthpieces 38, 46 positioned at a higher altitude than those of the first and second bottom walls 54, 60, the fluids flow via the acoustic orifice 50 then via the drainage hole 64. According to this second orientation, the resonator 34 is oriented so that the drainage hole 64 is situated close to or at a lowest point of the second bottom wall 60.

According to a second embodiment visible in FIGS. 10 to 14, the first chamber 36 comprises multiple drainage orifices 62, positioned on the first lateral wall 52, close to the first edge 52.1 of the first lateral wall 52, evenly distributed over all the periphery of the first lateral wall 52. In addition, the second chamber 44 comprises multiple drainage holes 64, positioned on the second bottom wall 60, close to the second edge 58.2 of the second lateral wall 58, evenly distributed over all the periphery of the bottom wall 60.

According to a configuration visible in FIGS. 10 to 14, the resonator 34 comprises eight drainage orifices 62 and eight drainage holes 64. Since the first and second chambers 36, 44 are tapered, coaxial and have a same axis of revolution Ax, each drainage orifice 62 is secant with a longitudinal plane containing the axis of revolution Ax that is also secant with a drainage hole 64.

Figure 13:
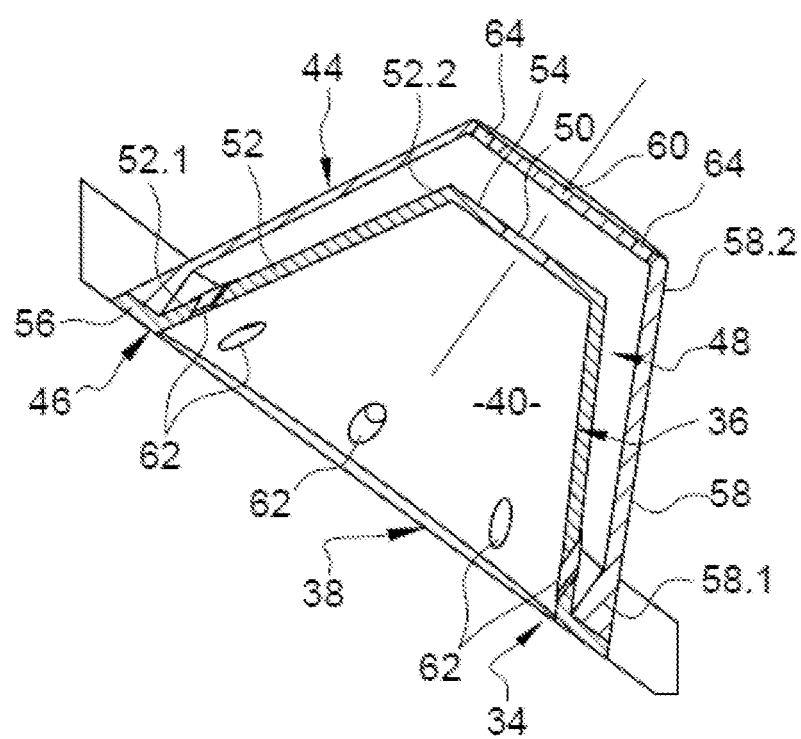
FIG. 13 is a cross section of the resonator, visible in FIG. 10, positioned in the upper part of a duct which illustrates the second embodiment.
Figure 14:
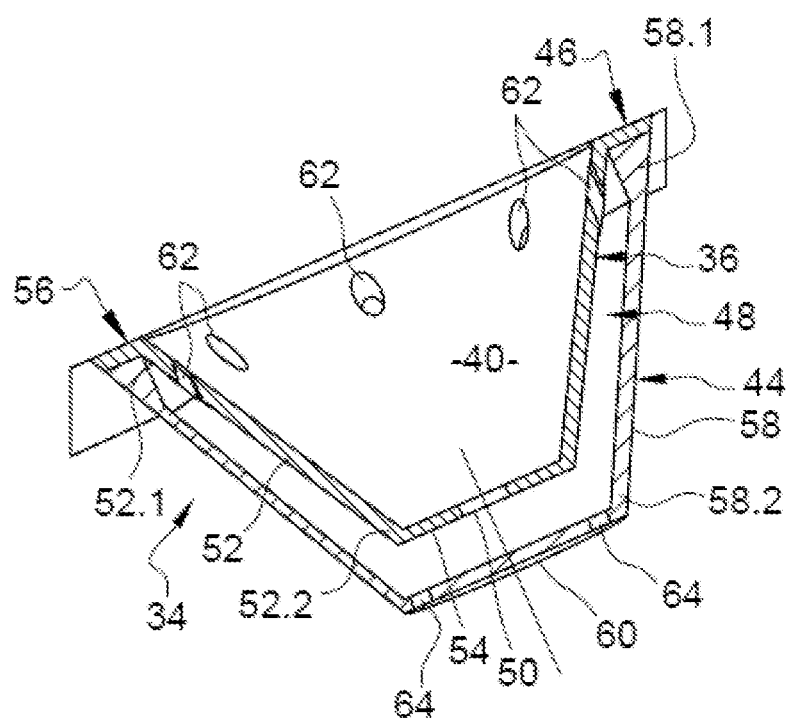
FIG. 14 is a cross section of the resonator, visible in FIG. 10, positioned in the lower part of a duct which illustrates the second embodiment.

According to the second embodiment, the drainage orifices 62 being evenly distributed over all the periphery of the first lateral wall 52, whatever the orientation of the resonator 34, one of them is necessarily positioned close to the lowest point of the first lateral wall 52, as illustrated in FIG. 14. Furthermore, the drainage holes 64 being evenly distributed over all the periphery of the second bottom wall 60, one of them is necessarily positioned close to the lowest point of the second bottom wall 60, as illustrated in FIG. 13.

Figure 15:
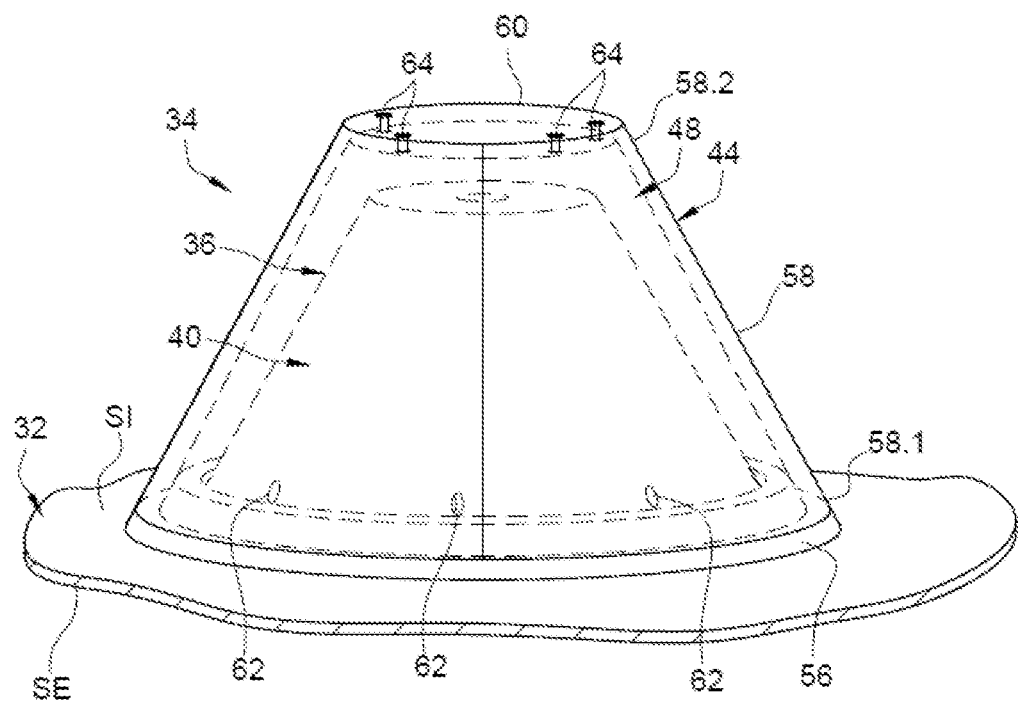
FIG. 15 is a perspective view of a resonator which illustrates an embodiment.
Figure 16:
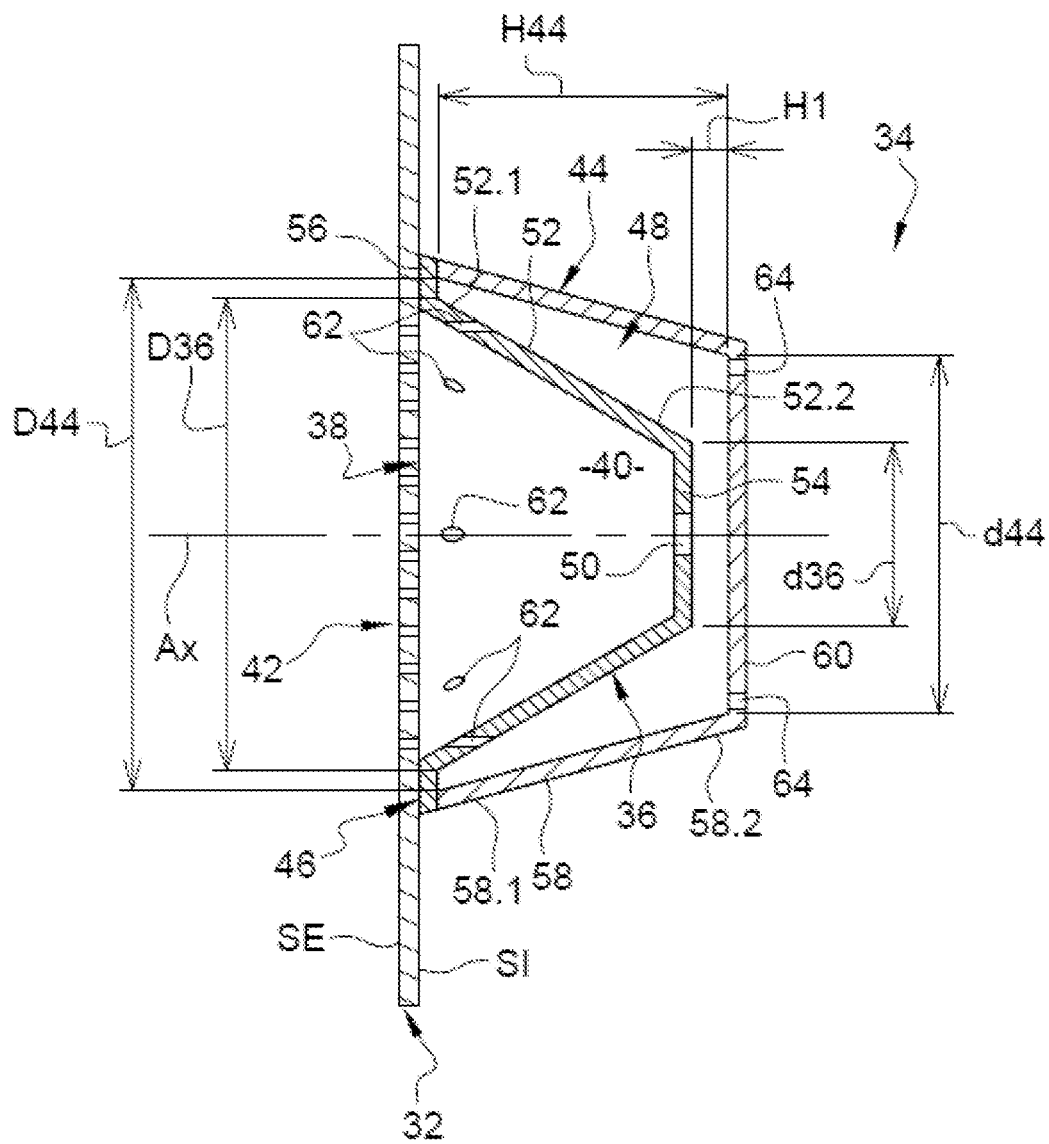
FIG. 16 is a cross section of the resonator visible in FIG. 15.

The number of drainage orifices 62 may not be the same as that of the drainage holes 64. According to a third embodiment visible in FIGS. 15 and 16, the resonator 34 comprises eight drainage orifices 62 and four drainage holes 64.

According to one embodiment, the drainage orifices 62 and/or the drainage holes 64 are cylindrical or oblong and have axes parallel to the axis of revolution Ax.

As an example, to give an order of magnitude, the first chamber 36 has a small diameter d36 (at its small base) of the order of 15 mm, a large diameter D36 (at its large base) of the order of 40 mm and forms a solid angle of the order of 60°. The second chamber 44 has a small diameter d44 (at its small base) lying between 17 and 42 mm, a large diameter D44 (at its large base) lying between 43 and 45 mm, a height H44 of the order of 25 mm, the height difference H1 between the first and second chambers 36, 44 being of the order of 4 mm.

The number of drainage orifices 62 lies between 4 and 12 and each of them has a diameter lying between 0.8 mm and 2 mm. The number of drainage holes 64 lies between 4 and 12 and each of them has a diameter lying between 0.8 mm and 2 mm.

It will be noted that the drainage orifices 62 contribute to the acoustic performance of the technology. Each drainage orifice 62 is configured so that the sum of the sections of the drainage orifices 62 and of the acoustic orifice 50 meets the acoustic demand according to the targeted frequency.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:
1. An acoustic absorption structure comprising a plurality of conically-shaped resonators, positioned against an inner surface of a skin, each comprising:
   a first chamber which has a first mouthpiece delimited by an edge pressed against the inner surface of the skin so that the first chamber and the skin delimit a first cavity,
   a second chamber in which is positioned the first chamber, at least partially spaced apart from the first chamber, which delimits, with the first chamber, a second cavity, at least one acoustic orifice passing through the first chamber to connect the first and second cavities, a porous zone, forming a part of the skin, making it possible, in operation, to connect a medium in which sound waves are propagated with the first cavity, wherein the first chamber comprises at least one drainage orifice passing through the first chamber and wherein the second chamber comprises at least one drainage hole passing through the second chamber, each drainage orifice and each drainage hole being configured to limit an accumulation of fluid in the resonator, wherein the first chamber comprises a first lateral wall which has a first edge forming the first mouthpiece, and wherein each drainage orifice is positioned on the first lateral wall, close to the first edge of the first lateral wall.

2. The acoustic absorption structure according to claim 1, wherein the first chamber comprises a single drainage orifice and wherein the resonator is oriented so that the drainage orifice is situated close to or at a lowest point of the first lateral wall.

3. The acoustic absorption structure according to claim 1, wherein the first chamber comprises multiple drainage orifices distributed over all a periphery of the first lateral wall.

4. The acoustic absorption structure according to claim 3, wherein the first chamber comprises a number of drainage orifices in a range between 4 and 12.

5. The acoustic absorption structure according to claim 3, wherein each drainage orifice has a diameter in a range between 0.8 and 2 mm.

6. The acoustic absorption structure according to claim 1, wherein the second chamber comprises a second lateral wall, delimited by a first edge oriented towards the skin and a second edge, and a second bottom wall positioned at a level of the second edge of the second lateral wall, and wherein each drainage hole is positioned on the second bottom wall, close to the second lateral wall.

7. The acoustic absorption structure according to claim 6, wherein the second chamber comprises a single drainage hole, and wherein the resonator is oriented so that the drainage hole is situated close or at a lowest point of the second bottom wall.

8. The acoustic absorption structure according to claim 6, wherein the second chamber comprises multiple drainage holes distributed over an entire periphery of the second bottom wall.

9. The acoustic absorption structure according to claim 1, wherein the second chamber comprises a number of drainage holes lying between 4 and 12.

10. The acoustic absorption structure according to claim 6, wherein each drainage hole has a diameter lying between 0.8 and 2 mm.

11. The acoustic absorption structure according to claim 1, wherein the first and second chambers have a same axis of revolution, and wherein each drainage orifice is secant with a longitudinal plane containing the axis of revolution that is also secant with a drainage hole.

12. An aircraft propulsive assembly comprising an acoustic absorption structure according to claim 1.

13. An aircraft comprising an acoustic absorption structure according to claim 1.

* * * * *